May 26, 1942.  E. GRAMPS  2,284,196
HEDGE TRIMMER
Filed April 17, 1941  2 Sheets-Sheet 1
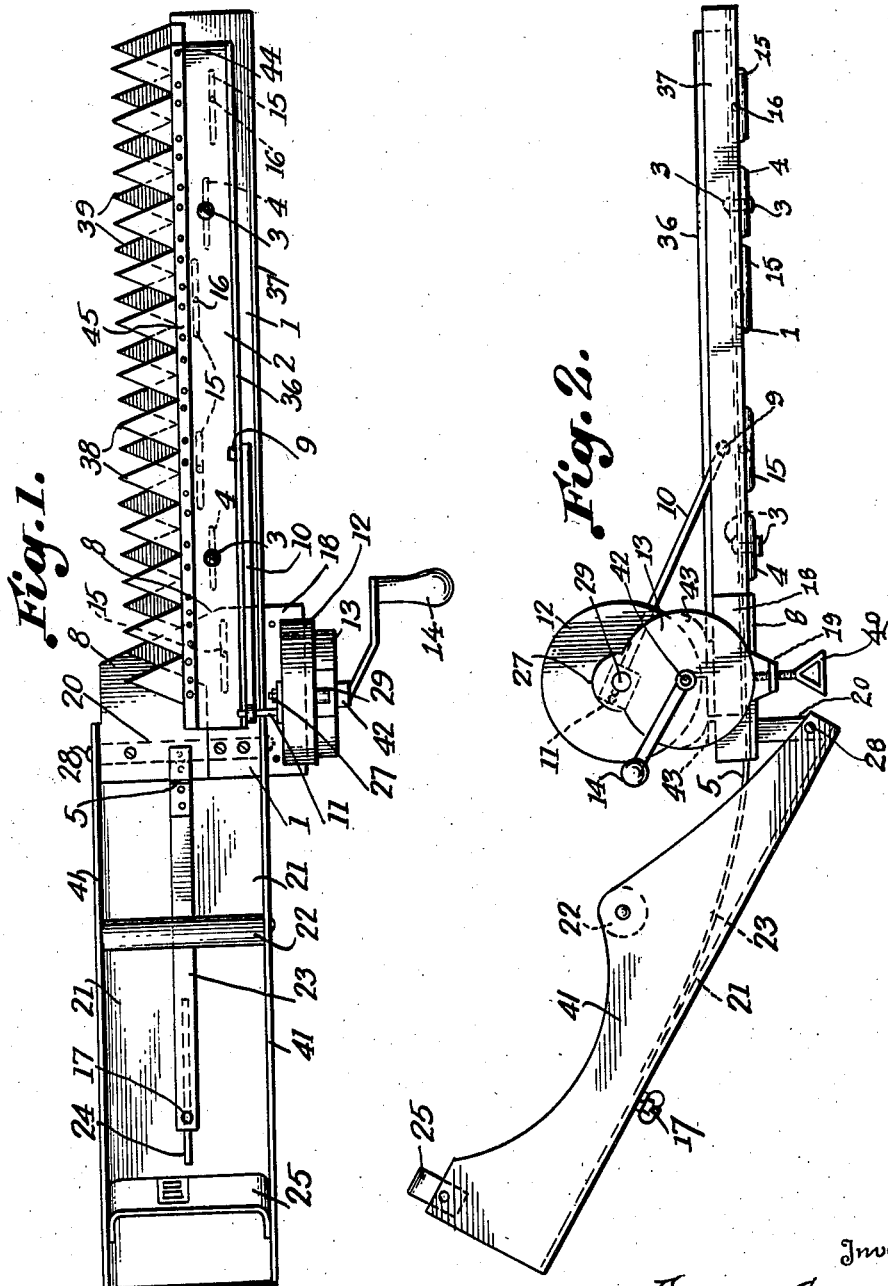
Inventor
EDWARD GRAMPS.
By N. S. Amstutz
Attorney

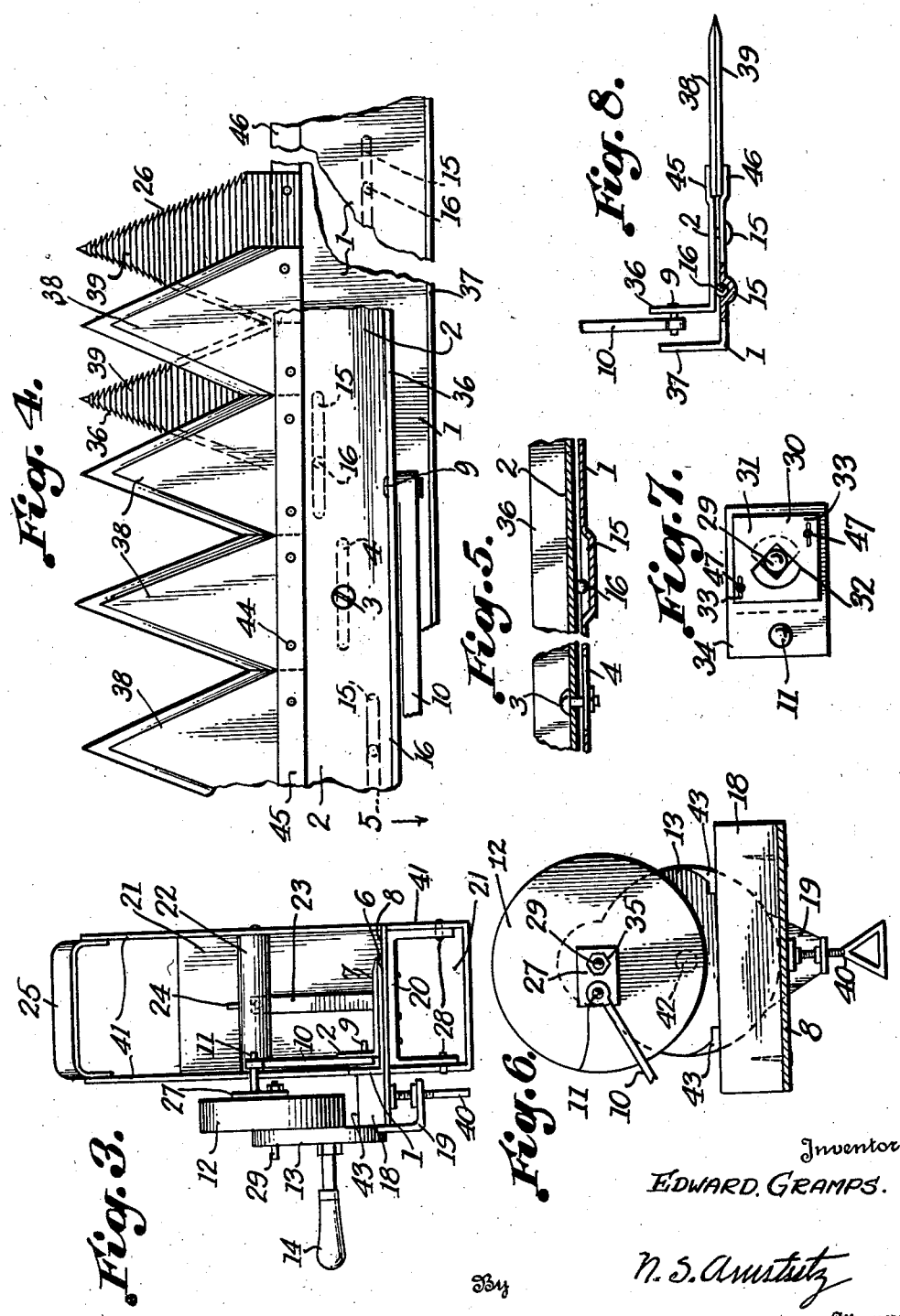

Patented May 26, 1942

2,284,196

UNITED STATES PATENT OFFICE 2,284,196

HEDGE TRIMMER

Edward Gramps, Valparaiso, Ind.

Application April 17, 1941, Serial No. 388,973

8 Claims. (Cl. 30—198)

My invention relates to improvements in hedge trimmers and it more especially comprises the features pointed out in the annexed claims.

The purpose of my invention is to provide a hedge trimmer that is usually entirely supported by the left hand and arm of the operator; that the cutting mechanism as a unit is adjustable in relation to the arm support adapting the device to varying heights of hedges and for holding it at other angles when the sides of a hedge are being trimmed; that uses a relatively short or longer sickle bar which is attached to the arm support by an intervening plate; that has a plurality of ball bearing grooves formed on the upper face of the sickle bar which grooves are on different planes crosswise of the bar; that provides retaining means from the knife bar to the sickle bar positioned between the two rows of grooves crosswise of the device; that uses antifriction balls in the lengthwise grooves, between the sickle bar and the knife bar; that has an attachable and detachable driving mechanism for reciprocating the knife bar; that uses a removable crank plate on the end of the driving spindle adaptable to different spindle diameters which plate is connected by a link to the knife bar; that may use a conventional household emery grinder clamped to the sickle bar support; and that takes advantage of the weight of the emery wheel, and its speed ratio to its hand crank, serving as a fly wheel and at the same time leaves the grinder available for use when detached from the trimmer.

With these and other ends in view I illustrate on the accompanying drawings such instances of adaptation as will disclose the broad features of the invention without limiting myself to the specific details shown thereon and described herein.

Fig. 1 is a top plan view of my assembled hedge trimmer.

Fig. 2 is a side elevation of Fig. 1.

Fig. 3 is an end elevation of Fig. 2 looking to the left.

Fig. 4 is an enlarged plan view of the sickle bar with the knife bar above it.

Fig. 5 is an elevation in section through the retaining pin for holding the two bars in operative relation to each other also showing an antifriction ball between the two bars.

Fig. 6 is an enlarged end elevation of the grinder looking toward the face of the emery wheel.

Fig. 7 is a detached elevation of a modified crank plate.

Fig. 8 is an end elevation partly in section of the assembled sickle and knife bars with detachable knives and detachable sickles.

In practising my invention I may use any desired alternatives or equivalents of structure that the exigencies of varying conditions may demand without departing from the broad spirit of the invention.

To clarify the description I have chosen to name the underneath bar a "sickle bar" and the reciprocating bar in antifriction relation to the bottom bar a "knife bar."

Conventional hedge trimmers are manually operated solely by a pair of handles, one for each hand. Another type of trimmer has a handle for the left hand by which it is held at the desired height. The right hand operates a crank for actuating the cutting mechanism. Both of these types are only supported by the hand of the operator without any assistance from the arm. I overcome these objections by substantially supporting the weight of the trimmer from the shoulder and the arm, leaving the left hand free to tilt the trimmer as desired and the right hand free to rotate the crank to operate the cutting bar. The weight of the trimmer is principally supported by the shoulder portion of the operator's arm and the position of the trimmer in an up-and-down and in an in-and-out relation is separately controlled by a hand grip forming a part of the arm support.

I show the cooperation of a conventional grinder that may be attached to the trimmer and detached therefrom as desired for use elsewhere. The relation of the grinder to the other mechanism is not aggregative because any equivalent driving mechanism will serve the same purpose. It is the adaptability of an attachable and detachable crank plate secured to the end of the emery wheel spindle that makes the associated speed increase feature of conventional grinders available without incurring any separate cost for the manufacturing of these parts.

The arm support to which the hedge trimmer is pivotally attached comprises a trough-like member 21. It has sides 41. At its upper end there is a retaining strap, or arm band 25. This may be provided with a buckle. Toward the lower end of the arm support there is a round hand grip 22 under which all the fingers of the operator's hand pass while the thumb is above it. At the lower end of the arm support it is pivoted to a U-shaped member 20 to which the sides 41 are pivoted at 28. On the U-shaped support 20 a plate 8 is secured. To this plate the sickle bar 1 is attached, and at one side of the plate a block 18 is secured. This block serves to position the grinder which rests on it by feet 43 and it is clamped by the projection 19 and screw 40.

The angular relation of the trimmer portion to the arm support may be changed as desired by reason of a spring-like connection 23 that is in pivotal relation to the plate 8 by a hinge 5. The outer end of this connection has a wing nut 17 that passes through a slot 24 for holding the arm support in different angular positions in relation to the trimming mechanism.

The trimming mechanism

This comprises a lower bar 1 called the sickle bar. It is secured to the plate 8. Above the sickle bar there is a knife bar 2. As shown in Fig. 3 the knives 7 are integrally formed with an upstanding flange and the sickles 6 are similarly formed with an upstanding flange. Both expedients secure stiffness and rigidity of the parts.

The sickles 6 and the knives 7 for cutting purposes are quite close together, yet in anti-friction relation by ball bearings 16. These bearings are formed by lengthwise grooves 15 in the sickle bar 1. The cutting bar 2 rides on top of the balls. It is held in place by screws or pins 3 which pass through slots 4 in the lower bar.

When the sickles and knives are formed separately from the bars the bar 1, as shown in Fig. 8, has an upstanding flange 37 and the bar 2 has an upstanding flange 36. The latter bar has an inverted "rabbeted" front edge or offset 45. On the underside the knives 38 are secured by rivets 44 or otherwise. Similarly the bar 1 has an inverted "rabbeted" front edge or offset 46 on which the sickles 39 are attached by rivets or otherwise. The sickles 6 or 39 may have serrated edges 26 to hold leaves and twigs from sliding out when the knives 38 engage them.

The driving mechanism

This as stated, may comprise a conventional household grinder or its equivalent. It includes an emery wheel 12, a gear box 13 and a hand crank 14. The emery wheel is secured to a spindle 29 and the hand crank is secured to a spindle 42. These spindles are interconnected conventionally by gears in the gear box 13.

The knife bar 2 is reciprocated by a link 10 pivoted to an upstanding angle 36 at 9. The other end of the link 10 is easily attached to and detached from the crank pin 11. This pin projects from an attachable and detachable crank plate 27 that is secured on the spindle 29 by a nut 35 or otherwise. In order that a crank plate may be adapted to different diameters of the emery wheel spindle 29 I may use the expedient shown in Fig. 7. In this the plate 27 is substituted by a plate 34. It has a V-shaped opening 31 and a front plate 30 has an oppositely formed V-shaped opening 32. The plate 30 is slidable on the plate 34 and the extent of this shift is controlled by screws 47 in slots 33. The two oppositely formed V's center the plates.

The high speed of the emery wheel 12 and the relatively slow speed of the handle 14 produces a very rapid reciprocation of the knives past the underneath sickles, thus securing a rapidity of action that is far superior to any system of hand levers or direct intermeshing gears which cannot produce an increase of speed at the cutting edges over the speed of hand operation.

The relation of the ball bearing grooves 15 positioned in two separate rows are shown in Figs. 1 and 4 and the position of the retaining screws 3 approximately midway between the two separate rows of ball bearings is important. This arrangement of parts insures that the parallelism between the sickles and the knives will be retained on the same horizontal plane thus avoiding any tendency of the respective bars twisting in relation to each other as the knife bar is reciprocated.

What I claim is:

1. A hedge trimmer comprising a sickle member, an adjustable arm support therefor, a cutting member reciprocatable adjacent the sickle member, attachable and detachable driving means for actuating the cutting member, and means for fixedly and adjustably holding said cutting means in different angular positions to the arm support.

2. A hedge trimmer comprising a sickle member, an adjustable arm support therefor, a cutting member reciprocatable adjacent the sickle member, attachable and detachable differential driving means for actuating the cutting member, means for fixedly holding the cutting means in different angular positions to the arm support, said driving means imparting rapid reciprocation of the knife bar through a relatively slow initial movement of the driving mechanism.

3. A hedge trimmer comprising trimming means, an adjustable arm support for said means, means for producing rapid to and from motion of the trimming means, and means for changing and holding the arm support in different angular positions to the trimming means.

4. A hedge trimmer comprising a stationary sickle member, a reciprocating cutting member, a conventional attachable and detachable grinder supported by the sickle member, an attachable and detachable crank plate adjustable on and secured to the grinding wheel spindle, and an attachable and detachable link connecting the crank plate to the reciprocating cutting means.

5. A hedge trimmer comprising a stationary sickle member, a reciprocating cutting member, a conventional attachable and detachable grinder supported by the sickle member, an adjustably attachable and detachable crank plate secured to the spindle of the grinding wheel, an attachable and detachable link connecting the crank plate to the reciprocating cutting means, an arm support for the cutting and driving mechanism, and means for changing the angular relation of the arm support to the trimming mechanism.

6. In hedge trimmers a stationary sickle member, a reciprocating cutting member in adjacent relation to the sickle member, a plurality of anti-friction bearings between the two members in separate rows and in spaced apart longitudinal relation, and retaining means for the two members positioned approximately midway of the two separate groups of anti-friction bearings whereby sidewise tilting of the cutting member in relation to the sickle member is prevented.

7. In hedge trimmers a fly-wheel driving mechanism, a trimming mechanism, connections therebetween, an adjustable crank plate on the driving mechanism, and means for securing the crank plate to the spindle of the driving mechanism in an adaptable manner to accommodate different diameters of the driving spindle.

8. A hedge trimmer comprising a reciprocating cutting member, a non-reciprocating cutting member, attachable and detachable means supported on the non-reciprocating member for actuating the reciprocating member, an adjustable arm support pivoted to the non-reciprocating member comprising an upper arm band, a hand grip positioned between the arm band and the stationary cutting member, and means for changing the angular relation of the non-reciprocating member to the pivoted arm support as desired.

EDWARD GRAMPS.